US012670412B2

(12) United States Patent
Lee

(10) Patent No.: US 12,670,412 B2
(45) Date of Patent: Jun. 30, 2026

(54) ARTIFICIAL INTELLIGENCE FEEDBACK METHOD AND ARTIFICIAL INTELLIGENCE FEEDBACK SYSTEM

(71) Applicant: KOREA HYDRO & NUCLEAR POWER CO., LTD., Gyeongju-si (KR)

(72) Inventor: Seung Chan Lee, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 701 days.

(21) Appl. No.: 18/019,119

(22) PCT Filed: Aug. 3, 2021

(86) PCT No.: PCT/KR2021/010175
§ 371 (c)(1),
(2) Date: Feb. 1, 2023

(87) PCT Pub. No.: WO2022/035116
PCT Pub. Date: Feb. 17, 2022

(65) Prior Publication Data
US 2023/0306278 A1     Sep. 28, 2023

(30) Foreign Application Priority Data
Aug. 12, 2020     (KR) ........................ 10-2020-0101337

(51) Int. Cl.
*G06N 5/02*          (2023.01)
(52) U.S. Cl.
CPC ...................................... *G06N 5/02* (2013.01)
(58) Field of Classification Search
CPC ...................................................... G06N 5/02

(Continued)

(56) References Cited

U.S. PATENT DOCUMENTS

2004/0006566 A1*   1/2004   Taylor .................... G06Q 10/10
2017/0287137 A1   10/2017   Lin et al.
2018/0366020 A1   12/2018   Bilic et al.

FOREIGN PATENT DOCUMENTS

JP          08-087508          4/1996
JP          2013-206408          10/2013
(Continued)

OTHER PUBLICATIONS

Li et al., "A deep neural network based quasi-linear kernel for support vector machines", IEICE Trans. Fundamentals, vol. E99-A, No. 12, Dec. 2016 (Year: 2016).*

(Continued)

*Primary Examiner* — Tsu-Chang Lee
(74) *Attorney, Agent, or Firm* — LEX IP MEISTER, PLLC

(57)          ABSTRACT

An artificial intelligence (AI) feedback method includes: providing input 1 and input 2, providing an initial condition for a popularity frequency value or ranking value of information related to input 2 from input 1, generating a two-dimensional (2D) information table from the initial condition, adding the popularity frequency value or ranking value to corresponding coordinates in the 2D information table and matching knowledge, generating a 2D pseudolinear transformation table from the 2D information table, performing pseudolinear transformation multiple times to form a 2D unique characteristic table and deriving information of coordinates whose characteristic vector is not changed as a deep truth value, and organizing and storing a context of knowledge formed by connecting the deep truth value by category.

5 Claims, 12 Drawing Sheets

(58) Field of Classification Search
USPC ........................................................... 706/45
See application file for complete search history.

(56) References Cited

FOREIGN PATENT DOCUMENTS

| | | |
|---|---|---|
| JP | 2013-254396 | 12/2013 |
| KR | 2017-0087434 | 7/2017 |
| KR | 10-1938212 | 1/2019 |

OTHER PUBLICATIONS

Peifeng Liang et al., "Large-scale image classification using fast SVM with deep quasi-linear kernel", 2017 International Joint Conference on Neutral Networks (IJCNN), IEEE, May 14, 2017, pp. 1064-1071.

Weite Li et al., "A Deep Neural Network Based Quasi-Linear Kernel for Support Vector Machines", IEICE Transactions on Fundamentals of Electronics, Communications and Computer Sciences, vol. E99.a, No. 12, Dec. 1, 2016, pp. 2558-2565.

Chunjie Zhang et al., "Undo the codebook bias by linear transformation for visual applications", Theory of Computing, ACM, 2 Penn Plaza Suite 701 New York NY 10121-701 USA, Oct. 21, 2013, pp. 533-536.

EPO, the extended European Search Report of EP 21856122.3 dated Sep. 19, 2024, total 10 pages.

* cited by examiner

FIG. 1

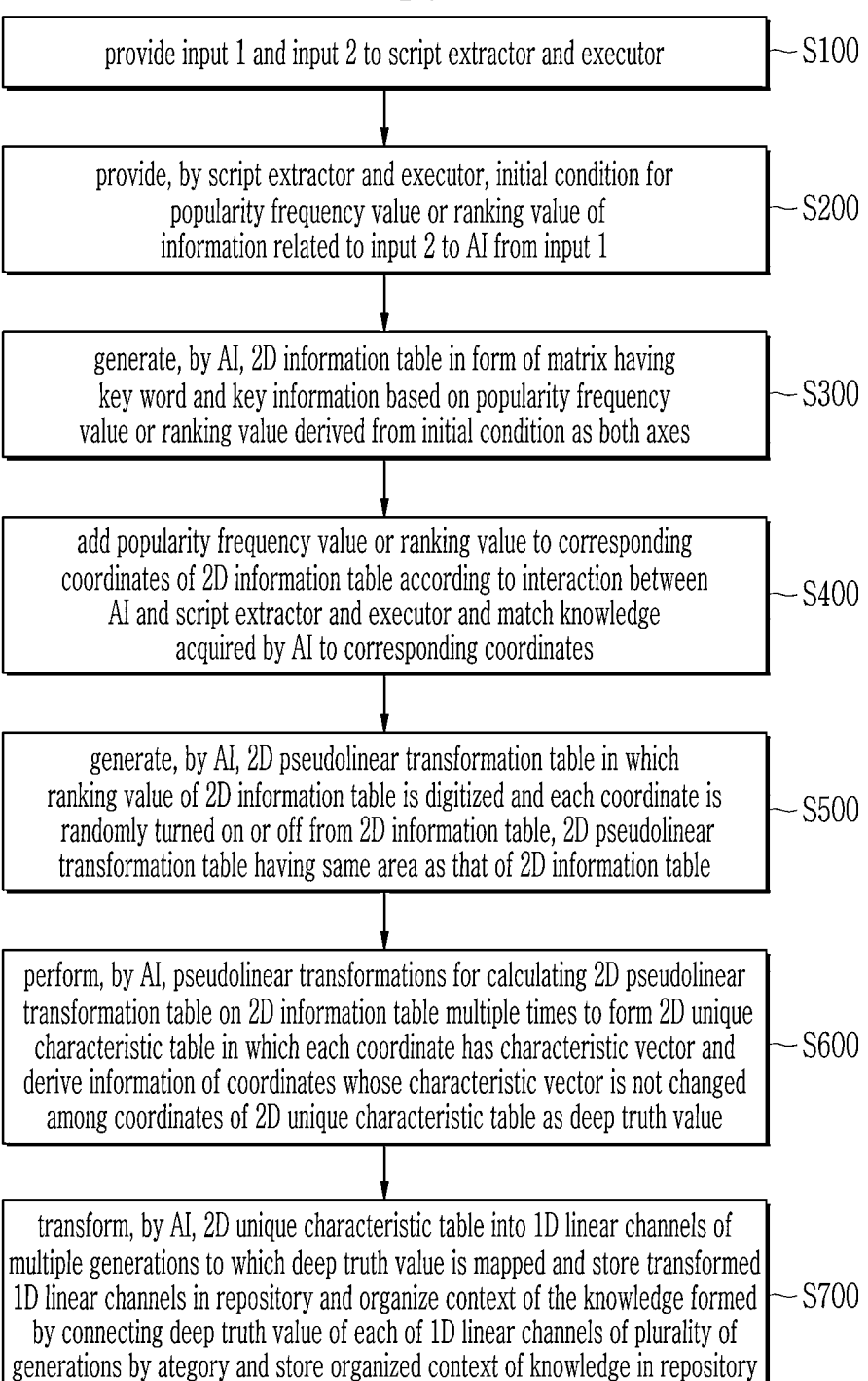

provide input 1 and input 2 to script extractor and executor ——S100 provide, by script extractor and executor, initial condition for popularity frequency value or ranking value of information related to input 2 to AI from input 1 ——S200 generate, by AI, 2D information table in form of matrix having key word and key information based on popularity frequency value or ranking value derived from initial condition as both axes ——S300 add popularity frequency value or ranking value to corresponding coordinates of 2D information table according to interaction between AI and script extractor and executor and match knowledge acquired by AI to corresponding coordinates ——S400 generate, by AI, 2D pseudolinear transformation table in which ranking value of 2D information table is digitized and each coordinate is randomly turned on or off from 2D information table, 2D pseudolinear transformation table having same area as that of 2D information table ——S500 perform, by AI, pseudolinear transformations for calculating 2D pseudolinear transformation table on 2D information table multiple times to form 2D unique characteristic table in which each coordinate has characteristic vector and derive information of coordinates whose characteristic vector is not changed among coordinates of 2D unique characteristic table as deep truth value ——S600 transform, by AI, 2D unique characteristic table into 1D linear channels of multiple generations to which deep truth value is mapped and store transformed 1D linear channels in repository and organize context of the knowledge formed by connecting deep truth value of each of 1D linear channels of plurality of generations by ategory and store organized context of knowledge in repository ——S700 transformation table having unique ranking value random on/off state for each coordinate of transformation table

FIG. 5

FIG. 7 knowledge category 1 knowledge category 2 knowledge category 3 knowledge category 4

FIG. 11

O AI training Case 1 (training through picture)

☞ recognition program studies 20 pictures separately
    (input 1: 20 jpg files. input 2: "intensity of outline" is popularity frequency value)

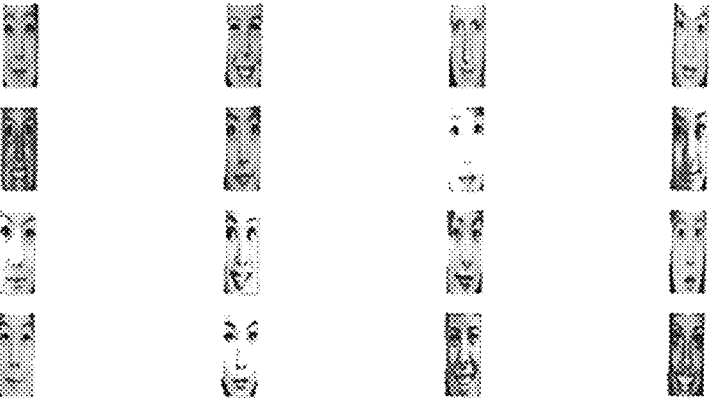

☞ result of recognition program generating characteristic vector with 20 pictures, finding characteristic value, and extracting picture information through deep truth value

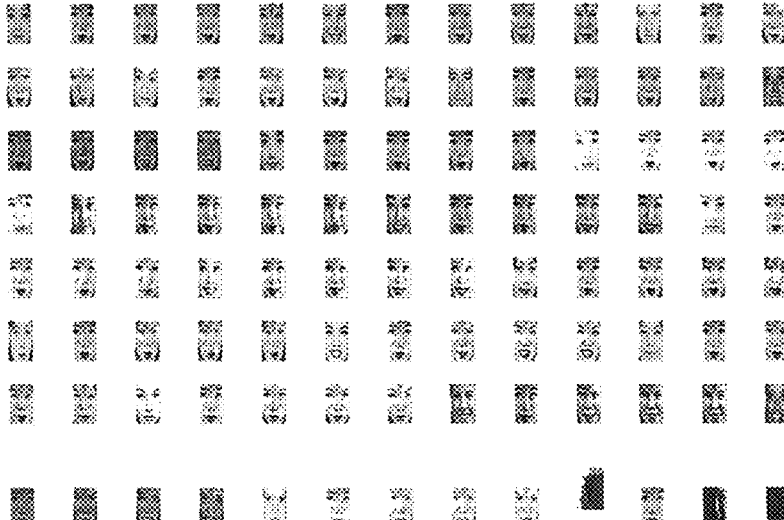

☞ result of deriving deep truth value through pseudolinear transformation

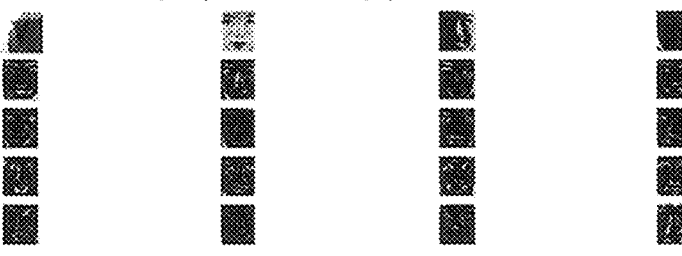

☞ Comprehensive conclusion or standard picture derived by AI

FIG. 12

○ : AI training Case 2 (training through document)

▶ type of input

☞ input 1 : What is justice.txt

☞ input 2 : justice, people, axiom, freedom, human, morality, happiness

▶ training result

☞ result of popularity frequency value ranking value from input 1 and input
(morality > axiom > people > freedom > human > justice > freedom)

Weights from input1                Weights from input2

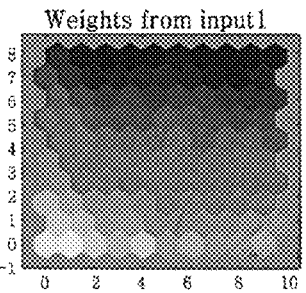          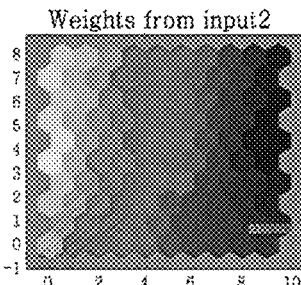

▶ comprehensive result of recognition program(derive deep truth value)

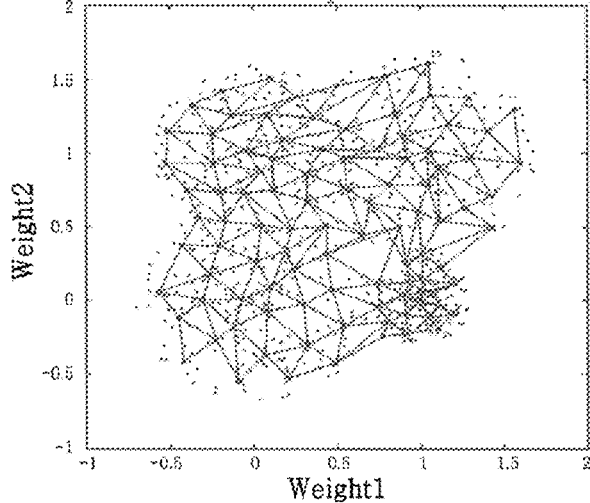

○ final result derived through pseudolinear transformation

☞ highest density area : morality, axiom

☞ conclusion of AI : Pursuing moral side and obtaining axiom are justice.

ARTIFICIAL INTELLIGENCE FEEDBACK METHOD AND ARTIFICIAL INTELLIGENCE FEEDBACK SYSTEM

TECHNICAL FIELD

The present invention relates to an artificial intelligence (AI) feedback method and AI feedback system.

BACKGROUND ART

A learning method of an AI of a related art has many steps and takes a long time depending on accumulated patterns or methods for realizing the accumulated pattern.

The learning method of the AI of the related art is a method in which there should be data unilaterally injected from the outside for an AI to build and recognize knowledge, and thereby find a new equilibrium point.

Since the learning method of the AI of the related art receives an enormous amount of information and relies on regression analysis and classification through the information, there are problems in which an exponentially large number of calculations and a long time are required as the learning step proceeds.

DISCLOSURE

Technical Problem

An exemplary embodiment is to provide an artificial intelligence (AI) feedback method and an AI feedback system in which intuitive feedback for learning is efficiently achieved.

Technical Solution

An exemplary embodiment of the present invention provides an artificial intelligence (AI) feedback method in which each step is performed by an AI feedback system implemented as a computing device including: providing input 1 including a basic material for learning and input 2 including core contents for learning to a script extractor and executor; providing, by the script extractor and executor, an initial condition for a popularity frequency value or a ranking value of information related to input 2 to an AI from input 1; generating, by the AI, a two-dimensional (2D) information table in the form of a matrix having a key word and key information based on the popularity frequency value or the ranking value derived from the initial condition as both axes; adding the popularity frequency value or the ranking value to corresponding coordinates of the 2D information table according to an interaction between the AI and the script extractor and executor and matching knowledge acquired by the AI to the corresponding coordinates; generating, by the AI, a 2D pseudolinear transformation table in which the ranking value of the 2D information table is digitized and each coordinate is randomly turned on or off from the 2D information table, the 2D pseudolinear transformation table having the same area as that of the 2D information table; performing, by the AI, pseudolinear transformations for calculating the 2D pseudolinear transformation table on the 2D information table multiple times to form a 2D unique characteristic table in which each coordinate has a characteristic vector and deriving information of coordinates whose characteristic vector is not changed among the coordinates of the 2D unique characteristic table as a deep truth value; and transforming, by the AI, the 2D unique characteristic table into 1 D linear channels of multiple generations to which the deep truth value is mapped and storing the transformed 1D linear channels in a repository and organizing a context of the knowledge formed by connecting the deep truth value of each of the 1D linear channels of the plurality of generations by category and storing the organized context of the knowledge in the repository.

Input 1 may include a plurality of picture files, and input 2 may include an intensity of an outline.

Input 1 may include a plurality of document files, and input 2 may include set words.

Another exemplary embodiment of the present invention provides an artificial intelligence (AI) feedback system including: a script extractor and executor receiving input 1 including a basic material for learning and input 2 including core content for learning, and generating an initial condition for a popularity frequency value or ranking value of information related to input 2 from input 1; an AI connected to the script extractor and executor, generating a two-dimensional (2D) information table in the form of a matrix having a key word and key information based on the popularity frequency value or the ranking value derived from the initial condition as both axes, adding the popularity frequency value or the ranking value to corresponding coordinates of the 2D information table, and matching the knowledge acquired by the AI to the corresponding coordinates; an output unit connected to the AI and outputting a deep truth value derived by the AI from the two-dimensional information table; and a repository connected to the AI and organizing and storing context of knowledge formed by connecting the deep truth value derived by the AI by category.

The AI may generate a 2D pseudolinear transformation table in which the ranking value of the 2D information table is digitized and each coordinate is randomly turned on or off from the 2D information table, the 2D pseudolinear transformation table having the same area as that of the 2D information table, perform pseudolinear transformations for calculating the 2D pseudolinear transformation table on the 2D information table multiple times to form a 2D unique characteristic table in which each coordinate has a characteristic vector and derive information of coordinates whose characteristic vector is not changed among the coordinates of the 2D unique characteristic table as a deep truth value, and transform the 2D unique characteristic table into 1 D linear channels of multiple generations to which the deep truth value is mapped and storing the transformed 1D linear channels in a repository and organize a context of the knowledge formed by connecting the deep truth value of each of the 1D linear channels of the plurality of generations by category and store the organized context of the knowledge in the repository.

Advantageous Effects

According to an exemplary embodiment, the artificial intelligence (AI) feedback method and the AI feedback system in which intuitive feedback for learning is efficiently performed are provided.

DESCRIPTION OF THE DRAWINGS

FIG. 1 is a flowchart illustrating an artificial intelligence (AI) feedback method according to an exemplary embodiment.

FIGS. 2 to 7 are diagrams illustrating an AI feedback method according to an exemplary embodiment.

FIG. 11 is an image showing training through pictures using an AI feedback method and an AI system.

FIG. 12 is an image showing training through documents using an AI feedback method and an AI system.

MODE FOR INVENTION

Hereinafter, exemplary embodiments of the present invention will be described in detail with reference to the accompanying drawings to allow those skilled in the art to practice the present invention. The present invention may be implemented in various different forms and is not limited to the examples as described herein.

In addition, unless explicitly described to the contrary, the word "comprise", and variations, such as "comprises" or "comprising", will be understood to imply the inclusion of stated elements but not the exclusion of any other elements.

Hereinafter, an artificial intelligence (AI) feedback method according to an exemplary embodiment will be described with reference to FIGS. 1 to 7.

FIG. 1 is a flowchart illustrating an AI feedback method according to an exemplary embodiment. FIGS. 2 to 7 are diagrams illustrating an AI feedback method according to an exemplary embodiment.

Figure 2:
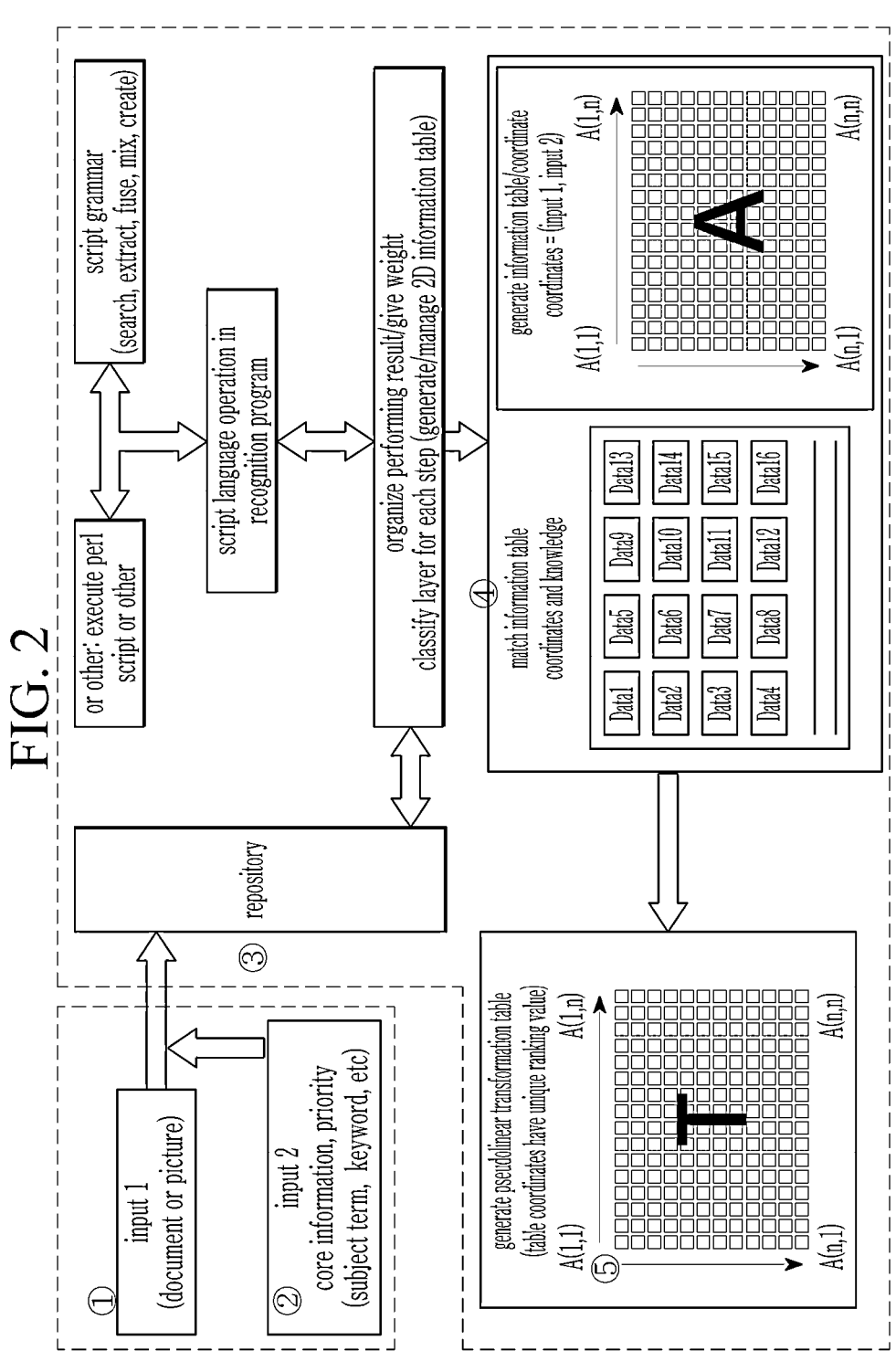

First, referring to FIGS. 1 and 2, input 1 and input 2 are provided to a script extractor and executor (S100).

Specifically, referring to ① and ② of FIG. 2, input 1 including a basic material for AI learning and input 2 including core contents for learning are provided to the script extractor and executor. As an example, input 1 may include a plurality of picture files, and input 2 may include an intensity of an outline, but is not limited thereto. As another example, input 1 may include a plurality of document files, and input 2 may include set words, but is not limited thereto.

This is a step of presenting input 1 and input 2, in which a material that recognition intelligence needs to learn or to be trained is prepared. It includes a basic material for AI learning, and input 1 may mainly be document files (text information, such as pdf and txt files, etc.) and picture files (picture information, such as jpg and png files, etc.), and input 2 is mainly a key word or key contents that AI needs to learn. For example, if input 1 is a document file, input 2 may be a key subject word, and if input 1 is a picture file, input 2 may be a level of contrast or an outline of a picture.

Next, the script extractor and executor provides an initial condition for a popularity frequency value or ranking value of information related to input 2 to AI from input 1 (S200).

Specifically, referring to ③ of FIG. 2, the script extractor and executor provides an initial condition for a popularity frequency value or ranking value of information related to input 2 to AI from input 1.

The script extractor and executor may include a program for extracting and executing a script, such as Perl Script, java, or a language script analyzer. The script extractor and executor provides recognition intelligence with an initial condition for a popularity frequency value or a ranking value of information related to a key subject word or key contents based on the contents of input 2 in the initial learning material.

Next, the AI generates a two-dimensional (2D) information table in the form of a matrix having a key word and key information based on the popularity frequency value or the ranking value derived from the initial condition as both axes (S300).

Specifically, referring to ③ and ④ of FIG. 2, the AI generates the 2D information table A in the form of a matrix having the key word and key information based on the popularity frequency value or the ranking value derived from the initial condition provided from the script extractor and executor as both axes.

The AI prepares to generate an initial 2D information table A with information on an initial popularity frequency value or ranking value. Recognition intelligence generates the 2D information table A, which is a 2D orthogonal table coordinate system, with key subject words and key contents found in document files or picture files, based on initial popularity frequency values or ranking values. The 2D information table A has a structure similar to a matrix, and may be a 2D orthogonal table coordinate system in which the key word and the key information are an x-axis and a y-axis, respectively.

Next, through an interaction between the AI and the script extractor and executor, the popularity frequency value or ranking value is added to the corresponding coordinates of the 2D information table A, and knowledge acquired by the AI is matched to the corresponding coordinates (S400).

Specifically, referring to ④ of FIG. 2, the popularity frequency value or ranking value is added to the corresponding coordinates of the 2D information table A through the interaction between the AI and the script extractor and executor, and knowledge acquired by the AI is matched to the corresponding coordinates.

Through interaction between the AI and the script extractor and executor, a popularity frequency, a proportion, or ranking value may be added to the corresponding coordinates of the 2D information table, which is a 2D rectangular table coordinate system, and knowledge acquired by the AI may be matched to the corresponding coordinates and managed.

Figure 3:
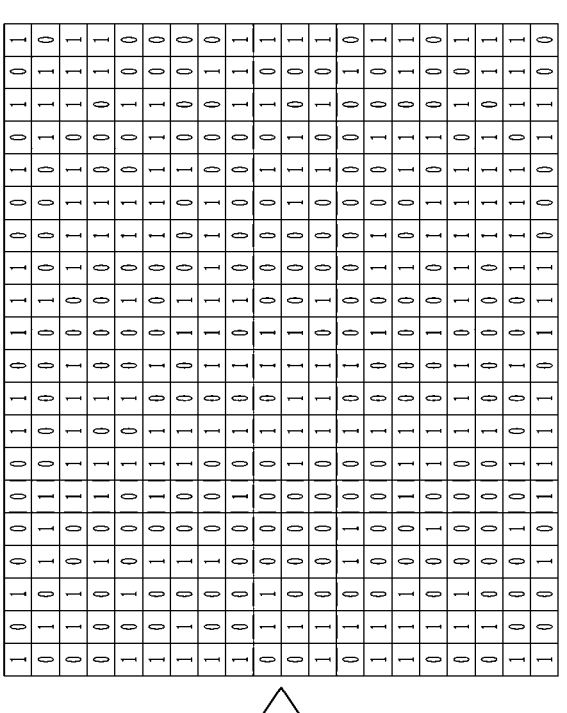

Next, referring to FIGS. 2 and 3, the AI generates a 2D pseudolinear transformation table T in which a ranking value of the 2D information table A is digitized and each coordinate is randomly turned on or off, the 2D pseudolinear transformation table T having the same area as the 2D information table A, is generated from the 2D information table A (S500).

Specifically, referring to ⑤ of FIG. 2 and FIG. 3, the AI generates a 2D pseudolinear transformation table T in which a ranking value of the 2D information table A is digitized and each coordinate is randomly turned on or off, the 2D pseudolinear transformation table T having the same area as the 2D information table A, is generated from the 2D information table A.

The AI generates a 2D pseudolinear transformation table T having the same size as that of the 2D information table A. The AI generates the 2D pseudolinear transformation table T by projecting and digitizing the ranking value of the information in the 2D information table A as it is to a point corresponding to each coordinate in the 2D pseudolinear transformation table T, and maintaining the digitized value of each coordinate as it is, but in the 2D pseudolinear transformation table T, each coordinate does not have a special pattern and is unpredictably and randomly turned on and off. The 2D pseudolinear transformation table T generated by the AI is an operation table for performing pseudolinear transformation.

Referring to FIG. 3, it is shown how the AI generates each stage of a 2D pseudolinear transformation table used for calculation in a feedback process and a derivation process by calculation and how a shape is configured. The 2D pseudolinear transformation table for each stage is configured to maintain the ranking value as it is, for which 1 or 0 is unpredictably and randomly generated and disposed randomly for each coordinate, thereby generating the 2D pseudolinear transformation table. For example, random ON and OFF states of the 2D pseudolinear transformation table may be generated by multiplying a left table and a right table of FIG. 3 for each identical coordinate.

Figure 4:
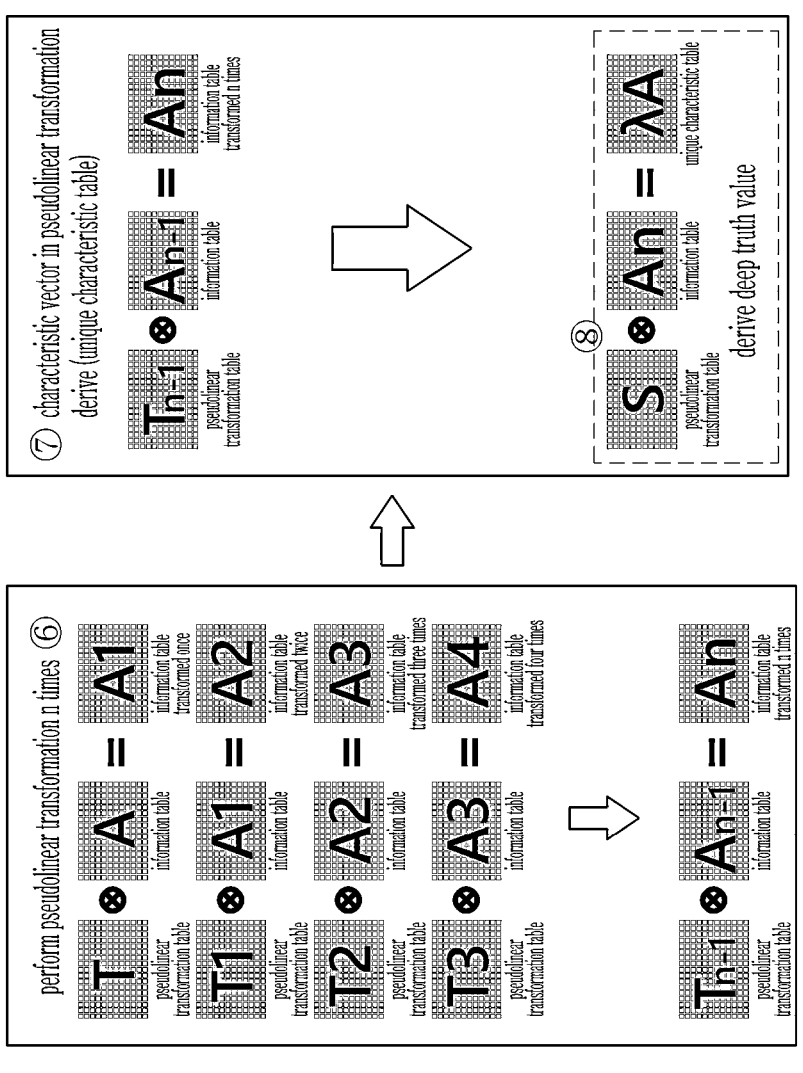
Figure 5:
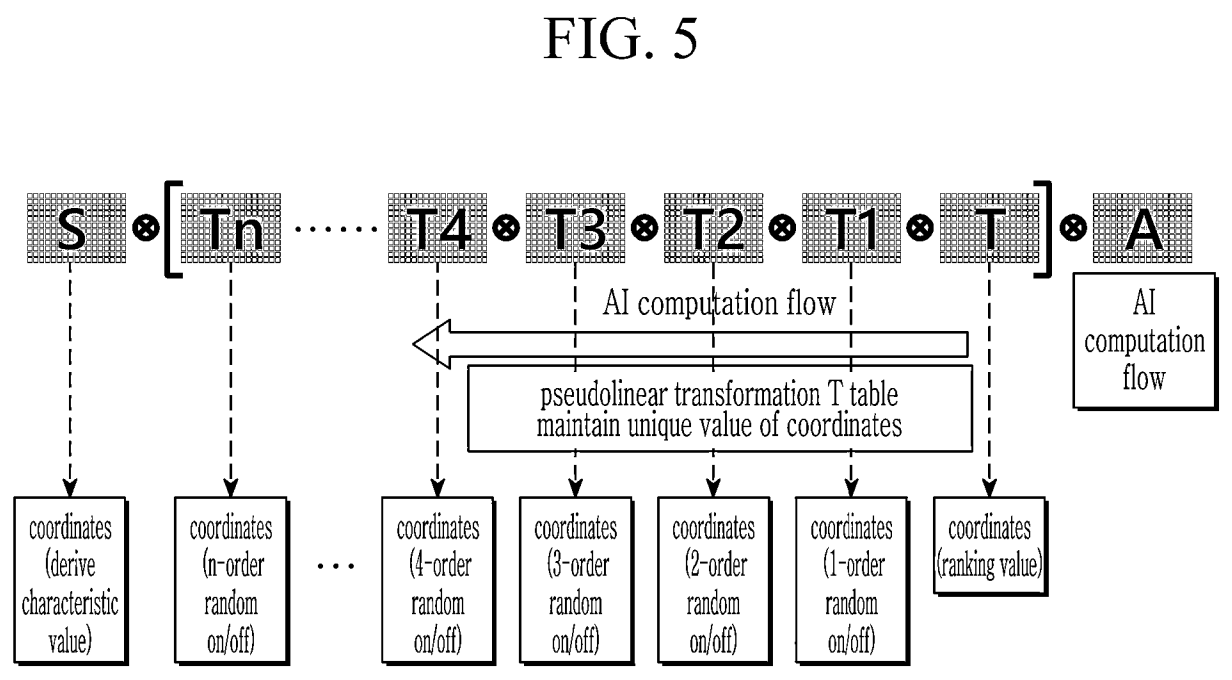

Next, referring to FIGS. 4 and 5, the AI performs a pseudolinear transformation for calculating the 2D pseudolinear transformation table T on the 2D information table A multiple times to form a 2D unique characteristic table in which each coordinate has a characteristic vector, and derives information of coordinates whose characteristic vector is not changed, among the coordinates of the 2D unique characteristic table, as a deep truth value (S600).

Specifically, referring to ⑥, ⑦, and ⑧ of FIG. 4 and FIG. 5, the AI performs a pseudolinear transformation for calculating the 2D pseudolinear transformation table T on the 2D information table A multiple times to form a 2D unique characteristic table in which each coordinate has a characteristic vector, and derives information of coordinates whose characteristic vector is not changed, among the coordinates of the 2D unique characteristic table, as a deep truth value.

When the 2D pseudolinear transformation table T is operated n times on the 2D information table A, an effect similar to that of a matrix operation appears. In the process of calculating the 2D pseudolinear transformation table T on the 2D information table A multiple times, the 2D information table A is transformed into a 2D unique characteristic table having a characteristic vector, and at this time, information which is not changed but survives is derived as a deep truth value that is not changed substantially.

When the 2D pseudolinear transformation table T is operated n times for each round of the 2D information table A, n times of pseudolinear transformation is performed. The 2D pseudolinear transformation table T generated here is generated by multiplying each factor at the same position unlike a general matrix operation, and each coordinate is randomly turned on and off.

Meanwhile, even if the 2D pseudolinear transformation table and an orthogonal table having the same area randomly giving ON and OFF are calculated to be rotated arbitrarily by 90 degrees, 180 degrees, 270 degrees, or 360 degrees, the truth value may be derived through calculation.

Referring to ⑥ of FIG. 4, it can be seen that pseudolinear transformation is performed n times. Referring to ⑦ of FIG. 4, the values of the pseudolinearly transformed 2D unique characteristic table include characteristic vectors and characteristic values so that they do not change any more or are closest to the truth. This makes it possible to find only a necessary information coordinate system so that only those that may be considered to be truth survive in the initial 2D information table coordinate values, and at this time, information matched to the surviving coordinate values becomes a deep truth value. Referring to ⑧ of FIG. 4, the process of deriving the deep truth value is similar to obtaining eigenvalues and eigenvectors in a matrix, but unlike matrix operation, pseudolinear transformation is performed by multiplying the 2D pseudolinear transformation table having the same area with unique ranking values in which each coordinate value is randomly ON and OFF is given by the same coordinate system of the 2D information table by stages in a one-to-one manner.

Referring to FIG. 5, the entire process shown in ⑥, ⑦, and ⑧ of FIG. 4 is organized as a continuous operation process of a T table of the coordinate system of the original 2D information table and 2D coordinate table including the corresponding coordinate values for pseudolinear transformation of the same dimension, and may be considered as a continuous combination of S table operations for characteristic table operation to find characteristic values or deep truth values. It conceptually shows how the knowledge and learning content of AI matched at each coordinate value of this 2D coordinate table survive in the coordinate system with great importance and are derived as a deep truth value. As a result of n times of pseudolinear transformation, a unique ranking value may or may not be given to the corresponding coordinate depending on the random ON/OFF state of each coordinate value. In detail, each coordinate is switched for each round, and the coordinate value is either ON or OFF. In this case, in each coordinate value, only the coordinate values in the ON state are maintained, and all coordinate values in the OFF state are treated as 0, so that the coordinate values in the OFF state have no effect on the corresponding coordinate of the 2D information table to which knowledge is matched in the calculation of the corresponding order, and thus, knowledge of the coordinate is recognized as unimportant, and only the coordinate in the ON state is recognized as important information as much as a weight of the ranking value. In this case, since the ON/OFF state for each round is randomly changed during n times of pseudolinear transformation, it acts like an unpredictable popularity vote. Due to this, if it survives to the end and has a relatively high proportion and ranking value, the unique characteristic table and unique characteristic value are selected by calculation by reflecting this state. This works like determining the ranking by obtaining the eigenvalues and eigenvectors of the matrix, but since the operation itself is a table generated by operating a transformation table and knowledge information table used for the operation in the same location, it undergoes a different process than the matrix operation. That is, the process of finding the unique characteristic table is unique.

As described above, by the AI feedback method according to an exemplary embodiment, the AI learns an ultimate deep truth value from input 1 and input 2.

In addition, the 2D unique characteristic table transformed from the 2D information table by the AI feedback method according to an exemplary embodiment generates a first generation information table layer. Through the process in which the AI leans and finds a deep truth value from another information by the AI feedback method, each of the 2nd, 3rd, 4th, and n-th generation 2D information table layers may be generated. For easier comparison and analysis using the generated 2D information table layer for each n-th generation, the AI may transform an ($n∟∖n$)-type 2D coordinate system into a linear form having ($n∟∖n$) channels for comparison and analysis, and the 2D coordinate system may be linearly mapped using the same.

Figure 6:
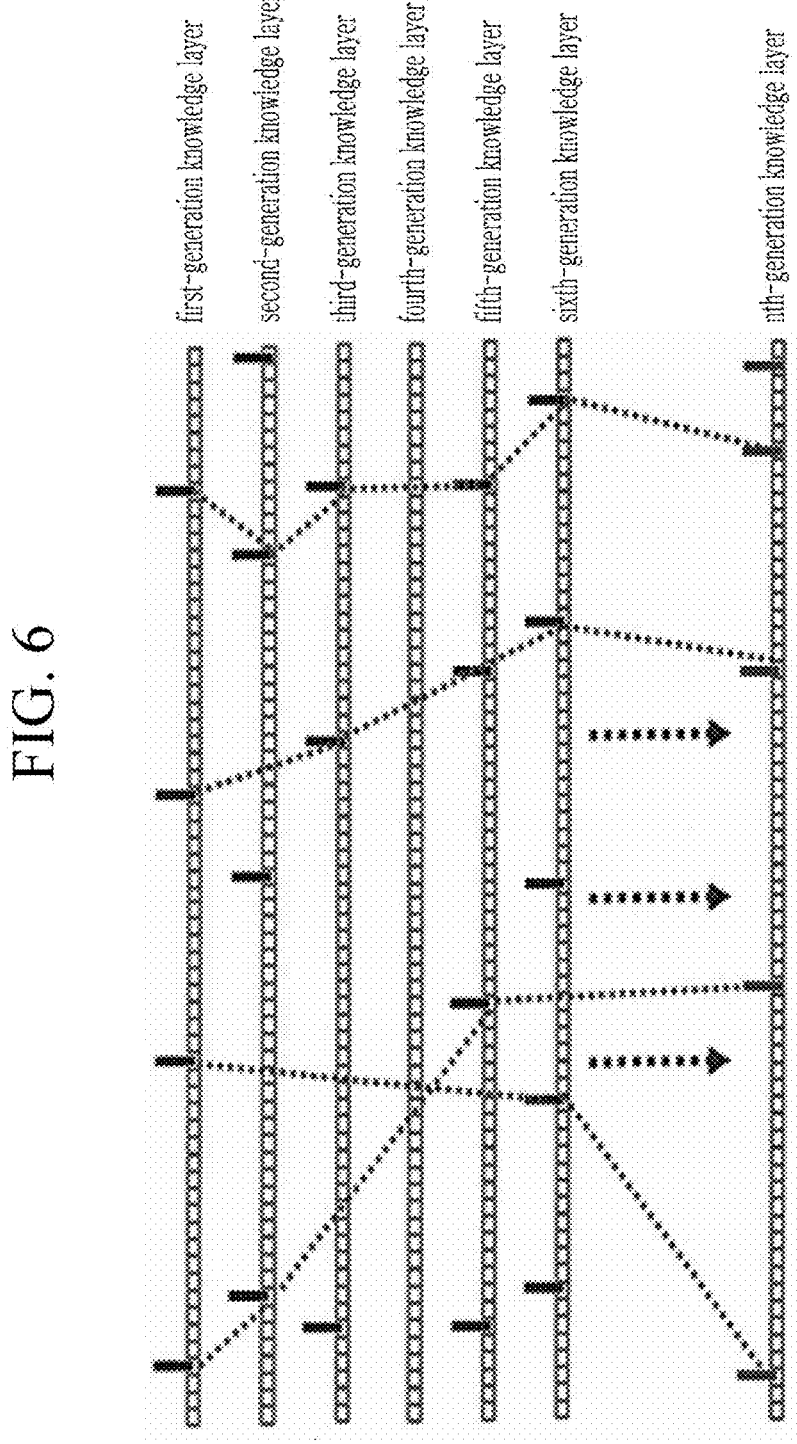
Figure 7:
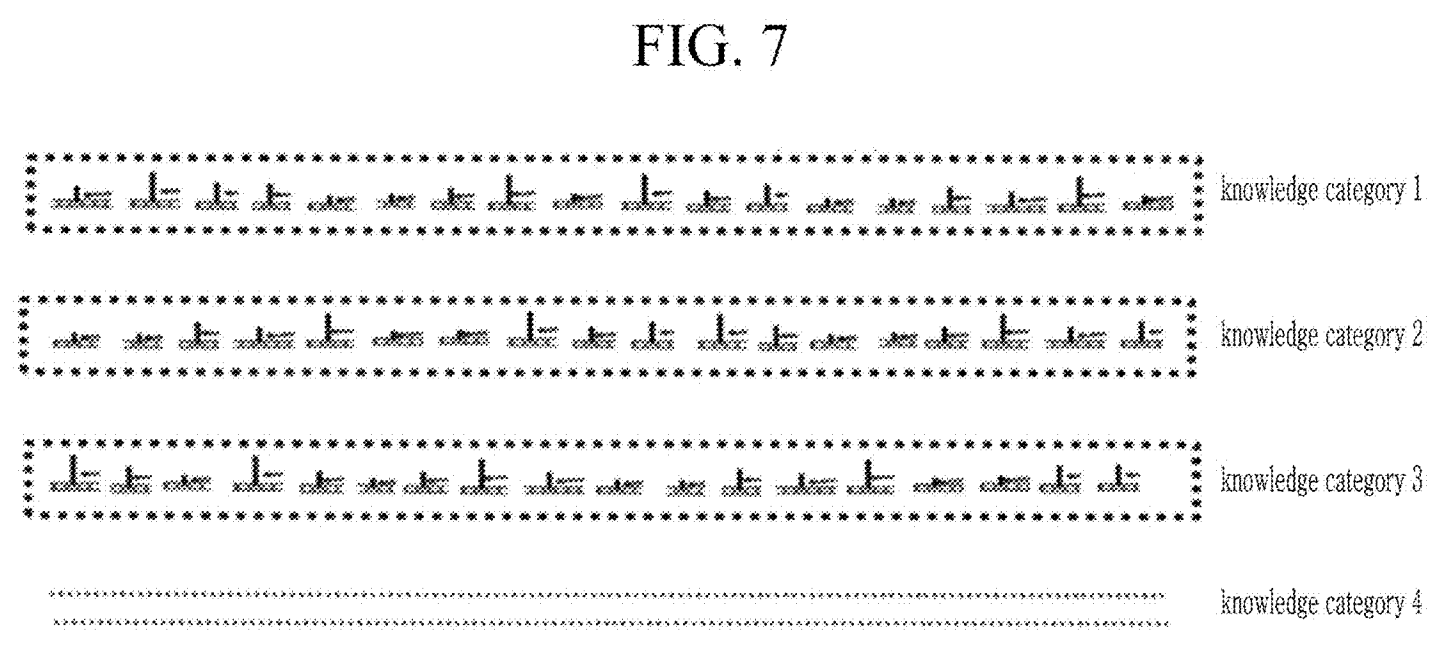

Next, referring to FIGS. 6 and 7, the AI transforms the 2D unique characteristic table into multiple generations of 1D linear channels (1 st generation knowledge layer to n-th generation knowledge layer) to which deep truth values are mapped and stored in the repository, organizes the context of knowledge formed by connecting the deep truth values of each of the multiple generations of 1D linear channels (1st generation knowledge layer to n-th generation knowledge layer) into categories (knowledge category 1 to knowledge category n), and stores the same in the repository (S700).

Specifically, referring to FIG. 6, using the repository, the AI transforms all 2D coordinates of a 2D unique characteristic table into multiple generations of 1D linear channels (1st generation knowledge layer to n-th generation knowledge layer) having linear channel values to map and fill deep truth values to the corresponding channels, and connects the deep truth values of each of the 1D linear channels of multiple generations to form a context of information and knowledge.

For example, if a 2D unique characteristic table including deep truth values acquired by the AI from each generation is ( n∟∧n ) type 2D coordinate system, each coordinate may be mapped to ( n∟∧n ) linear channels, and the corresponding channel marked with a red bar given with a deep truth value for each generation may be connected to a value of a knowledge layer given with a deep truth value related to a next generation. By associating several knowledge layers in this manner, the context of knowledge may be inferred and formed.

Also, referring to FIG. 7, the AI constructs systematized knowledge by organizing and storing main information constituting the context of information and knowledge by category (knowledge category 1 to knowledge category n) in the repository.

For example, the AI may organize knowledge by dividing knowledge constructed by deep truth values or contexts of deep knowledge connected through several generations into categories of knowledge using the repository.

The AI feedback method according to an exemplary embodiment constructs a coordinate system based on input 1 and input 2 through initial input data and core keywords and efficiently accumulates knowledge from the beginning by giving a relative ranking value according to frequency, priority, etc. to each coordinate value and matching and accumulating the knowledge discovered by the AI to the coordinate system and coordinate values constructed in the 2D coordinate table. Therefore, in the AI feedback method according to an exemplary embodiment, the method of reaching a final conclusion by deriving a deep truth value, which is the final purpose, is more efficient than in the related art, and by conceptually implementing this method, information is processed and analyzed to help the AI more efficiently reach the final conclusion and also be used as a core technology based on the knowledge construction of the AI, so the effectiveness may be increased.

That is, an AI feedback method in which intuitive feedback for learning is efficiently performed is provided.

Hereinafter, an AI feedback system according to another exemplary embodiment will be described with reference to FIGS. 8 to 10. The AI feedback system according to another exemplary embodiment may perform the AI feedback method according to the exemplary embodiment described above, but is not limited thereto.

Figure 8:
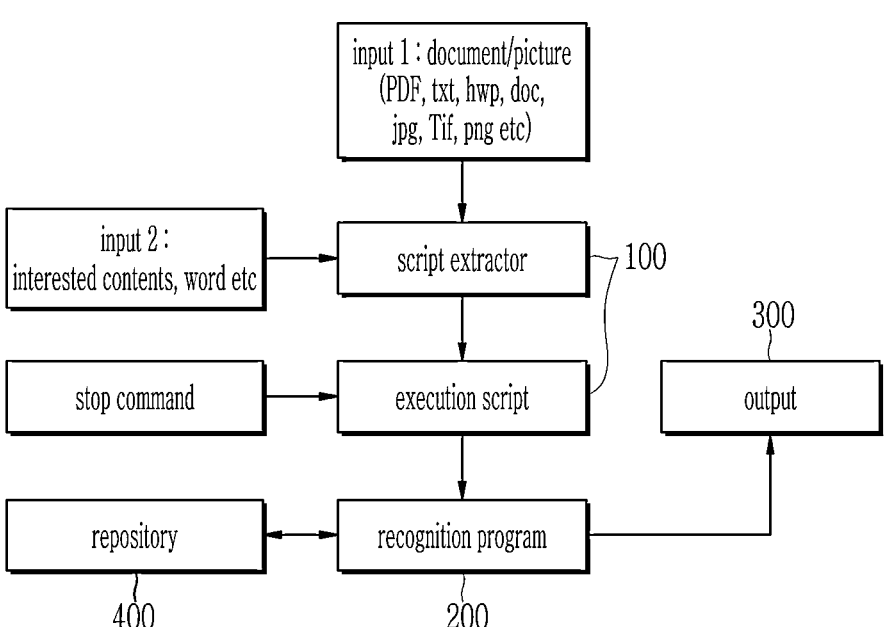
FIG. 8 is a diagram illustrating an AI feedback system according to another exemplary embodiment.

FIG. 8 is a diagram illustrating an AI feedback system according to another exemplary embodiment.

Referring to FIG. 8, the AI feedback system according to another exemplary embodiment includes a script extractor and executor 100, an AI 200, an output unit 300, and a repository 400.

The script extractor and executor 100 receives input 1 including a basic material for learning and input 2 including core contents for learning, and generates an initial condition for a popularity frequency value or ranking value of information related to input 2 from input 1.

The AI 200 is connected to the script extractor and executor 100, generates 2D information table in the form of a matrix having a key word and key information based on the popularity frequency value or the ranking value derived from the initial condition as both axes, adds the popularity frequency value or the ranking value to corresponding coordinates of the 2D information table, and matches the knowledge acquired by the AI to the corresponding coordinates.

The AI 200 generates a 2D pseudolinear transformation table in which the ranking value of the 2D information table is digitized and each coordinate is randomly turned on or off from the 2D information table, the 2D pseudolinear transformation table having the same area as that of the 2D information table, performs pseudolinear transformations for calculating the 2D pseudolinear transformation table on the 2D information table multiple times to form a 2D unique characteristic table in which each coordinate has a characteristic vector and derives information of coordinates whose characteristic vector is not changed among the coordinates of the 2D unique characteristic table as a deep truth value, and transforms the 2D unique characteristic table into 1 D linear channels of multiple generations to which the deep truth value is mapped and stores the transformed 1D linear channels in the repository 400 and organizes a context of the knowledge formed by connecting the deep truth value of each of the 1D linear channels of the plurality of generations by category and stores the organized context of the knowledge in the repository 400.

The output unit 300 is connected to the AI 200, and the AI 200 outputs a deep truth value derived from a 2D information table.

The repository 400 is connected to the AI 200, and organizes and stores the context of knowledge formed by connecting the deep truth values derived by the AI 200 by category.

Figure 9:
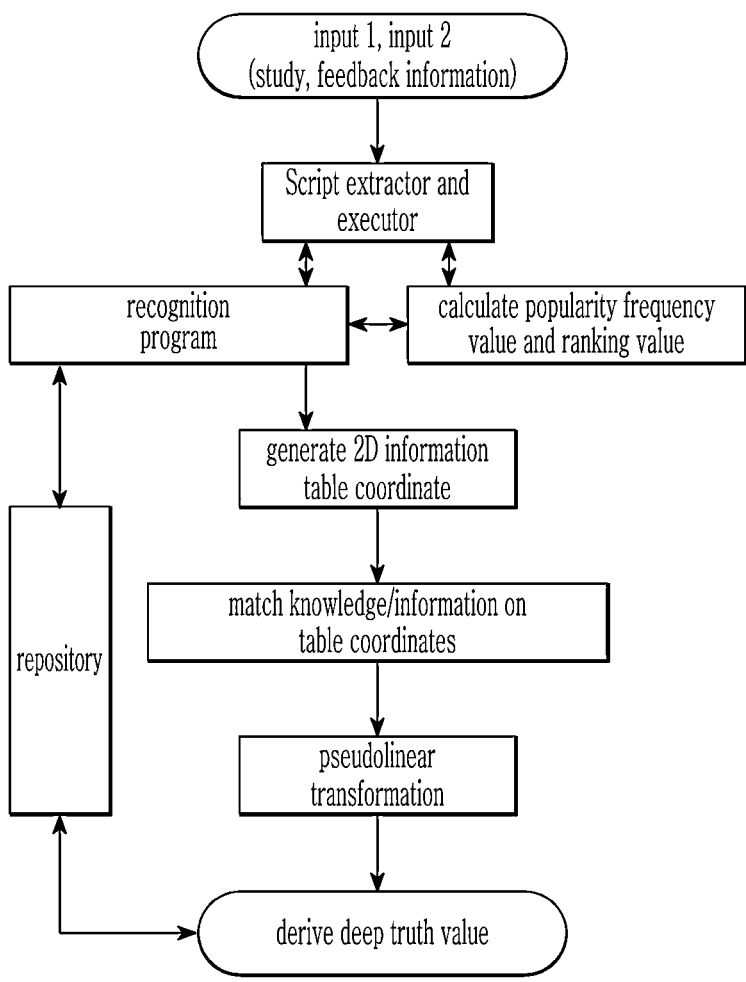
FIGS. 9 and 10 are diagrams illustrating an AI feedback system according to another exemplary embodiment.
Figure 10:
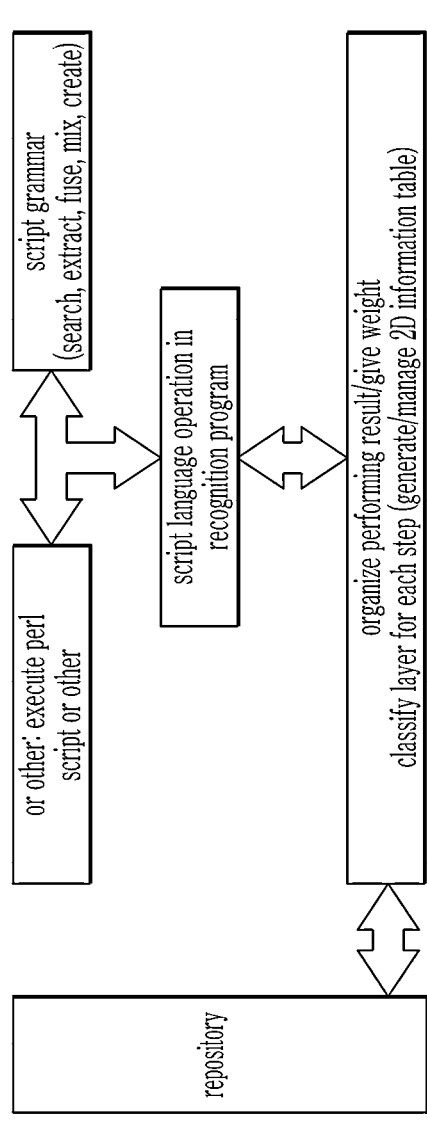

FIGS. 9 and 10 are diagrams illustrating an AI feedback system according to another exemplary embodiment.

Referring to FIGS. 8 and 9, input 1, which is information on a document or picture corresponding to an initial input to be learned by a recognition program as the AI, and input 2, which corresponds to a priority key word to be dealt with first, are shown. The recognition program corresponding to the AI interacts with the script extractor and executor that provides a means of interacting with or examining the input data. The script extractor and executor is a system language, such as a Perl script that retrieves information of a powerful document or input file, and is used by the recognition program to extract data necessary for the recognition program and calculate frequency values. Perl scripts may perform functions, such as word extraction, adjacent word extraction, and basic search and statistics on sentence similarity. The AI collects analysis data and performs feedback through a special window of such a built-in script grammar, and stores the 2D information table that makes specific information knowledgeable or the learning result matched to the coordinates of the 2D coordinate table. The 2D coordinate table may be based on coordinates that become information coordinate axes represented by input 1 and input 2. At this time, the information coordinate axis may be transformed into a vertical line form according to the convenience of calculation. A stop command sets as an initial condition how many times the AI should learn. If no special initial condition is given, the AI, a recognition program, goes through n times of pseudolinear transformation to obtain the eigenvalues and eigenvectors of the matrix as if to a point where a value of a characteristic vector table or a characteristic table is rarely changed, and learns until it finds a deep truth value that does not require feedback and computation. If there is no special input for the stop command, it works like that, and when a stop command is given, learning and calculation of the AI are terminated with the stop command, and the deep truth value that is the learning result is output to the output unit. In this case, the AI may construct systematized knowledge by organizing the context of knowledge formed by connecting deep truth values into categories and storing them in the repository.

Referring to FIG. 10, it conceptually shows how the corresponding script extraction, script execution, and the recognition program that is the AI interact. It can be confirmed that the recognition program, which is the AI, is a structure that searches and analyzes necessary information and words by manipulating script language. In this way, the recognition program continuously feeds back itself with input 1 and input 2 using script extractor and executor, and creates a 2D information table and a 2D table coordinate system to make the weight of knowledge a coordinate distribution in the form of a popularity frequency value or a ranking value, and separately stores specific text information on the coordinates in a coordinate system of the same size to continuously store information matched to the coordinates. All of the above information may be stored in the repository by the AI.

Hereinafter, training through pictures will be described as an example of learning using an AI feedback method and an AI system with reference to FIG. 11.

FIG. 11 is an image showing training through pictures using an AI feedback method and an AI system.

Referring to FIG. 11, training through pictures may be a process of finding features of jpg files to derive deep truths and finding comprehensive commonalities to generate pictures.

Specifically, a jpg file having a certain size of pixels is trained.

For the features of the picture file, a high popularity frequency value (a concept similar to the weight of a variable) is given mainly to the outline, and a precondition is given that the others are not characteristic.

Since a picture file may be considered as a kind of document, the recognition program recognizes the value of each pixel in the picture file, calculates the popularity frequency value by itself, and sets the cumulative value for the corresponding pixel.

After a certain period of time, characteristic values based on cumulative distribution values are given, and ranking values are re-ranked according to the rankings of the characteristic values. Here, the ranking value plays a similar role to the weight.

Each pixel may be matched on a certain plane, that is, to each coordinate of a matrix-shaped table, the matrix-shaped table has a distribution of information values for the picture, and from these values, a matrix-shaped table having the same dimension is made, while maintaining the ranking values of each pixel for the information values of the matrix-shaped table created by the recognition program as they are, a random table is created so that the ranking values are displayed or not displayed for each coordinate in each table, and the table acts like a linear transformation of a matrix to find a deep truth value.

When the pseudolinear transformation by each random table is performed in the script executor, a characteristic vector representing a deep truth value is generated in each transformed table, which behaves similarly to the eigenvalues and eigenvectors of a matrix.

When a characteristic vector value is generated, it may be ranked according to the size of the characteristic value of the characteristic vector, which plays a role in emphasizing the pixel representing the characteristic of the picture in the picture, and completes the process of finding a kind of deep truth value.

The completed result becomes a standard picture that is completed by finding a kind of commonality among all the pictures learned.

Hereinafter, training through documents will be described as another example of learning using an AI feedback method and an AI system with reference to FIG. 12.

FIG. 12 is an image showing training through documents using an AI feedback method and an AI system.

Referring to FIG. 12, training through documents may be a process of finding relevance through txt documents and creating deep truth.

*79

Specifically, a document having a certain size, in this case, a txt file, is selected and trained.

In the learning process, the txt file is input in input 1, and key words or matters of interest are input in input 2.

With the suggested word or word of interest in input 2, a popularity frequency distribution of the key word and sentences containing the key word are found and a characteristic value according to the frequency is given.

Key words are matched to a matrix-shaped table to generate a layer of knowledge to be learned, and the frequency distribution corresponds to which coordinates are matched to the coordinate values.

In the exemplary embodiment, about 7 key words are listed, and a table similar to a 7×7 matrix considering combinations by 3 words is formed to generate coordinate values with the related words as axes (indicated by numbers in the coordinate system).

Each coordinate is given a ranking value according to the popularity frequency, and after the ranking value is given to each coordinate, the recognition program recognizes the value of each coordinate, calculates the popularity frequency value by itself, and sets the cumulative value at the coordinate.

After a certain period of time, characteristic values based on cumulative distribution values are given, and the ranking values are re-ranked according to the rankings of the characteristic values. Here, ranking values play a role similar to weights.

Each pixel may be matched on a certain plane, that is, to each coordinate of a matrix-shaped table, the matrix-shaped table has a distribution of information values for each coordinate, and from these values, a matrix-shaped table having the same dimension is made, while maintaining the ranking values of each coordinate for the information values of the matrix-shaped table created by the recognition program as they are, a random table is created so that the ranking values are displayed or not displayed for each coordinate in each table, and the table acts like a linear transformation of a matrix to find a deep truth value.

After a certain period of time, the ranking value of each coordinate in the table is maintained, but a characteristic vector representing a value randomly is generated, which behaves like the eigenvalue and eigenvector of a matrix.

When a characteristic vector value is generated, it may be ranked according to the size of the characteristic vector value, which emphasizes meaningful sentences with key words in txt or documents, and the process of finding a kind of deep truth value by combination or fusion is completed.

The completed result has the result of drawing a kind of comprehensive conclusion from the learned document.

The exemplary embodiments of the present invention have been described in detail, but the scope of the present invention is not limited thereto and various variants and modifications by a person skilled in the art using a basic concept of the present invention defined in claims also belong to the scope of the present invention.

DESCRIPTION OF REFERENCE NUMERALS

Script extractor and executor 100, AI 200, output unit 300, repository 400

The invention claimed is:

1. An artificial intelligence (AI) feedback method in which each step is performed by an AI feedback system implemented as a computing device, the AI feedback method comprising:

providing input 1 including a basic material for learning and input 2 including core contents for learning to a script extractor and executor;

providing, by the script extractor and executor, an initial condition for a popularity frequency value or a ranking value of information related to input 2 to an AI from input 1;

generating, by the AI, a two-dimensional (2D) information table in the form of a matrix having a key word and key information based on the popularity frequency value or the ranking value derived from the initial condition as both axes;

adding the popularity frequency value or the ranking value to corresponding coordinates of the 2D information table according to an interaction between the AI and the script extractor and executor and matching knowledge acquired by the AI to the corresponding coordinates;

generating, by the AI, a 2D pseudolinear transformation table in which the ranking value of the 2D information table is digitized and each coordinate is randomly turned on or off from the 2D information table, the 2D pseudolinear transformation table having the same area as that of the 2D information table;

performing, by the AI, pseudolinear transformations for calculating the 2D pseudolinear transformation table on the 2D information table multiple times to form a 2D unique characteristic table in which each coordinate has a characteristic vector and deriving information of coordinates whose characteristic vector is not changed among the coordinates of the 2D unique characteristic table as a deep truth value; and transforming, by the AI, the 2D unique characteristic table into 1D linear channels of multiple generations to which the deep truth value is mapped and storing the transformed 1D linear channels in a repository and organizing a context of the knowledge formed by connecting the deep truth value of each of the 1D linear channels of the plurality of generations by category and storing the organized context of the knowledge in the repository.

2. The AI feedback method of claim 1, wherein:
input 1 includes a plurality of picture files, and
input 2 includes an intensity of an outline.

3. The AI feedback method of claim 1, wherein:
input 1 includes a plurality of document files, and
input 2 includes set words.

4. An artificial intelligence (AI) feedback apparatus comprising:

a computing device configured to implement:

a script extractor and executor receiving input 1 including a basic material for learning and input 2 including core content for learning, and generating an initial condition for a popularity frequency value or ranking value of information related to input 2 from input 1;

an AI connected to the script extractor and executor, generating a two-dimensional (2D) information table in the form of a matrix having a key word and key information based on the popularity frequency value or the ranking value derived from the initial condition as both axes, adding the popularity frequency value or the ranking value to corresponding coordinates of the 2D information table, and matching the knowledge acquired by the AI to the corresponding coordinates;

an output unit connected to the AI and outputting a deep truth value derived by the AI from the two-dimensional information table; and a repository connected to the AI and organizing and storing context of knowledge formed by connecting the deep truth value derived by the AI by category.

5. The AI feedback apparatus of claim 4, wherein:

the AI generates a 2D pseudolinear transformation table in which the ranking value of the 2D information table is digitized and each coordinate is randomly turned on or off from the 2D information table, the 2D pseudolinear transformation table having the same area as that of the 2D information table, performs pseudolinear transformations for calculating the 2D pseudolinear transformation table on the 2D information table multiple times to form a 2D unique characteristic table in which each coordinate has a characteristic vector and derives information of coordinates whose characteristic vector is not changed among the coordinates of the 2D unique characteristic table as a deep truth value, and transforms the 2D unique characteristic table into 1D linear channels of multiple generations to which the deep truth value is mapped and stores the transformed 1D linear channels in a repository and organizes a context of the knowledge formed by connecting the deep truth value of each of the 1D linear channels of the plurality of generations by category and stores the organized context of the knowledge in the repository.

\* \* \* \* \*